US009610636B2

(12) United States Patent
Pierce et al.

(10) Patent No.: US 9,610,636 B2
(45) Date of Patent: Apr. 4, 2017

(54) PIPE MACHINING APPARATUSES AND METHODS OF OPERATING THE SAME

(71) Applicant: Illinois Tool Works Inc., Glenview, IL (US)

(72) Inventors: Kenneth R. Pierce, Arlington Heights, IL (US); Michael W. Gearhart, Prospect Heights, IL (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 720 days.

(21) Appl. No.: 13/792,652

(22) Filed: Mar. 11, 2013

(65) Prior Publication Data

US 2014/0190321 A1 Jul. 10, 2014

Related U.S. Application Data

(60) Provisional application No. 61/750,444, filed on Jan. 9, 2013.

(51) Int. Cl.
*B23B 3/26* (2006.01)
*B23D 21/04* (2006.01)
(Continued)

(52) U.S. Cl.
CPC .................. *B23B 3/26* (2013.01); *B23B 5/08* (2013.01); *B23B 5/163* (2013.01); *B23D 21/04* (2013.01);
(Continued)

(58) Field of Classification Search
CPC ....... B23B 2260/008; B23B 3/26; B23B 5/08; B23B 5/163; B23D 21/04
(Continued)

(56) References Cited

U.S. PATENT DOCUMENTS 760,128 A 5/1904 Jackson
768,128 A 5/1904 Jackson
(Continued)

FOREIGN PATENT DOCUMENTS

AU 2006282045 A1 6/2006
CN 1093959 A 10/1994
(Continued)

OTHER PUBLICATIONS

International Search Report and Written Opinion for PCT/US2013/077718 dated Sep. 5, 2014, 14 pages.
(Continued)

*Primary Examiner* — Sara Addisu
(74) *Attorney, Agent, or Firm* — Klintworth & Rozenblat IP LLC

(57) ABSTRACT

Pipe machining apparatuses and methods of operating are provided. In one aspect, a pipe machining apparatus includes an advancement mechanism coupled to a frame and adapted to move relative to the frame between a first position, in which the advancement mechanism is in a travel path of an advancement member and is adapted to be engaged by the advancement member to advance a tool, and a second position, in which the advancement mechanism is positioned out of the travel path of the advancement member and is not adapted to be engaged by the advancement member. In another aspect, a pipe machining apparatus includes multiple motors and pinion gears engaged with a gear rack of a tool carrier. In a further aspect, a pipe machining apparatus includes a race wiper. In yet another aspect, a pipe machining apparatus includes a race lubrication member.

8 Claims, 11 Drawing Sheets

(51) Int. Cl.
*B23B 5/08* (2006.01)
*B23B 5/16* (2006.01)

(52) U.S. Cl.
CPC ... *B23B 2260/008* (2013.01); *Y10T 82/16065* (2015.01); *Y10T 82/16442* (2015.01); *Y10T 82/16475* (2015.01)

(58) Field of Classification Search
USPC .................. 82/1.2, 1.4, 1.5, 113, 101, 128
See application file for complete search history.

(56) References Cited

U.S. PATENT DOCUMENTS

| | | | |
|---|---|---|---|
| 1,074,334 A | | 9/1913 | Vosper |
| 1,097,152 A | | 5/1914 | Wagner |
| 1,279,022 A | | 9/1918 | Scott |
| 1,979,966 A | | 11/1934 | Farr et al. |
| 1,985,541 A | | 12/1934 | Hoefer |
| RE20,974 E | | 1/1939 | Guirl et al. |
| 2,493,512 A | * | 1/1950 | Vickers .................. B23Q 5/033 409/146 |
| 2,537,916 A | | 1/1951 | Rosenboom |
| 2,567,833 A | | 9/1951 | Warren et al. |
| 2,635,270 A | | 4/1953 | Dawson |
| 2,902,875 A | * | 9/1959 | Finally .................. B23D 39/00 409/146 |
| 3,650,514 A | | 3/1972 | Stunkard |
| 3,665,482 A | * | 5/1972 | Cresswell ................ H01Q 3/08 343/765 |
| 3,732,618 A | | 5/1973 | Lorenz |
| 3,819,163 A | | 6/1974 | Stunkard |
| 3,848,489 A | | 11/1974 | Santana |
| 4,050,335 A | | 9/1977 | Gilmore |
| 4,063,355 A | | 12/1977 | Netzel |
| 4,318,391 A | | 3/1982 | Wachs et al. |
| 4,402,136 A | | 9/1983 | Rast |
| 4,490,909 A | | 1/1985 | Wachs et al. |
| 4,543,861 A | | 10/1985 | Kwech et al. |
| 4,614,136 A | | 9/1986 | Pertle |
| 4,625,464 A | | 12/1986 | Kubo |
| 4,655,108 A | | 4/1987 | Galos |
| 4,677,884 A | | 7/1987 | Kwech et al. |
| 4,682,919 A | | 7/1987 | Mitchell |
| 4,739,685 A | * | 4/1988 | Ricci ....................... B23B 3/26 30/97 |
| 4,762,038 A | * | 8/1988 | Olson ................... B23D 21/04 30/97 |
| 4,770,074 A | * | 9/1988 | Kwech .................. B23B 5/163 30/97 |
| 4,791,842 A | * | 12/1988 | Olson ................... B23D 21/04 403/330 |
| 4,813,314 A | * | 3/1989 | Kwech .................. B23B 5/163 30/97 |
| 4,880,340 A | * | 11/1989 | Taki ........................ B23G 5/10 408/149 |
| 4,939,964 A | * | 7/1990 | Ricci ....................... B23B 5/168 30/97 |
| 4,944,205 A | * | 7/1990 | Ricci ....................... B23B 3/26 82/113 |
| 5,054,342 A | * | 10/1991 | Swiatowy ............... B23B 5/163 82/113 |
| 5,085,619 A | * | 2/1992 | Torii ....................... B25J 9/103 474/138 |
| 5,123,771 A | | 6/1992 | Okuno |
| 5,159,868 A | | 11/1992 | Thomas et al. |
| 5,368,399 A | | 11/1994 | Tremblay |
| 5,429,021 A | | 7/1995 | Astle et al. |
| 5,467,627 A | | 11/1995 | Smith et al. |
| 5,549,024 A | * | 8/1996 | Ricci ....................... B23B 5/16 82/101 |
| 5,775,188 A | * | 7/1998 | Strait ...................... B23B 3/265 408/147 |
| 5,894,772 A | * | 4/1999 | Nodar .................... B23B 5/162 82/113 |
| 5,941,145 A | * | 8/1999 | Marshall ................ B23B 5/163 279/123 |
| 6,257,110 B1 | * | 7/2001 | Ricci ..................... B23D 45/126 82/113 |
| 6,293,174 B1 | | 9/2001 | Rulseh |
| 6,401,864 B1 | | 6/2002 | Stringer |
| 6,604,896 B2 | * | 8/2003 | Feldman ................. B23Q 1/52 409/166 |
| 6,615,696 B2 | * | 9/2003 | Ricci ....................... B23B 3/265 82/113 |
| 6,619,164 B1 | | 9/2003 | Ricci |
| 6,634,838 B2 | * | 10/2003 | Kitamura ............... B23Q 1/626 408/234 |
| 6,810,587 B1 | | 11/2004 | Robertson |
| 6,966,731 B2 | | 11/2005 | VanderPol et al. |
| 7,270,505 B2 | | 9/2007 | VanderPol et al. |
| 7,992,473 B2 | * | 8/2011 | Marple .................. B23D 21/02 82/113 |
| 8,250,953 B2 | | 8/2012 | Hall et al. |
| 8,534,170 B2 | * | 9/2013 | Arnemann ............... B23B 3/26 82/113 |
| 8,584,557 B2 | * | 11/2013 | Hall ........................ B23B 3/26 82/113 |
| 8,584,558 B2 | * | 11/2013 | Phillips, II ............. B23B 3/26 82/113 |
| 8,997,611 B1 | * | 4/2015 | Walton .................. B23P 15/003 384/451 |
| 9,021,927 B2 | * | 5/2015 | Phillips, II ............. B23B 3/26 82/113 |
| 9,050,669 B2 | * | 6/2015 | Coakley ................. B23B 5/08 |
| 9,278,417 B2 | * | 3/2016 | Pierce .................... B23D 21/04 |
| 2001/0001935 A1 | | 5/2001 | Wilk, Jr. |
| 2007/0241250 A1 | | 10/2007 | Wong |
| 2009/0229919 A1 | | 9/2009 | McDonald et al. |
| 2010/0162860 A1 | | 7/2010 | Hall et al. |
| 2010/0162862 A1 | | 7/2010 | Hall et al. |
| 2012/0054998 A1 | | 3/2012 | Tschida |
| 2013/0152748 A1 | | 6/2013 | Wokan et al. |
| 2014/0096655 A1 | * | 4/2014 | Coakley ................. B23B 5/08 82/72 |
| 2014/0190322 A1 | | 7/2014 | Pierce et al. |
| 2014/0196582 A1 | | 7/2014 | Pierce et al. |
| 2015/0053060 A1 | | 2/2015 | Coakley |
| 2016/0136741 A1 | * | 5/2016 | Pierce .................... B23D 21/04 82/70.2 |

FOREIGN PATENT DOCUMENTS

| | | |
|---|---|---|
| CN | 2254385 Y | 5/1997 |
| CN | 2761329 Y | 3/2006 |
| CN | 2934709 Y | 8/2007 |
| CN | 101573198 A | 11/2009 |
| CN | 101932400 A | 12/2010 |
| DE | 3521697 A1 | 2/1986 |
| DE | 102005019349 A1 | 2/2006 |
| GB | 818753 A | 8/1959 |
| GB | 828940 A | 2/1960 |
| GB | 956906 A | 4/1964 |
| GB | 1450774 A | 9/1976 |
| JP | 2013-002606 A | 1/2013 |
| NL | 7907801 A | 4/1981 |
| SK | 277770 B6 | 12/1994 |
| TW | 201129436 A | 9/2011 |
| WO | 2007024326 A1 | 3/2007 |
| WO | 2007/052035 A1 | 5/2007 |
| WO | 2010/077346 A1 | 7/2010 |

OTHER PUBLICATIONS

International Search Report and Written Opinion for PCT/US2013/077719 dated Jul. 4, 2014, 18 pages.
International Search Report and Written Opinion for PCT/US2013/077721 dated Aug. 22, 2014, 19 pages.
International Search Report and Written Opinion for PCT/US2016/046690 dated Oct. 24, 2016, 14 pages.

(56) References Cited

OTHER PUBLICATIONS

International Search Report and Written Opinion from corresponding International Application PCT/US2016/040496 dated Sep. 14, 2016, 14 pages.

* cited by examiner

PIPE MACHINING APPARATUSES AND METHODS OF OPERATING THE SAME

RELATED APPLICATIONS

The present application claims the benefit of U.S. Provisional Patent Application No. 61/750,444, filed Jan. 9, 2013, the entire contents of which is incorporated herein by reference.

FIELD OF THE INVENTION

The present disclosure generally relates to pipe machining apparatuses and, more particularly, to split frame pipe machining apparatuses for machining large diameter pipes.

BACKGROUND

A variety of different types of pipe machining apparatuses exist to perform various machining processes on pipes. One such process includes cutting pipes. Large diameter pipes may be cut with a split frame pipe machining apparatus, which includes two frame halves that surround the pipe from respective sides and are coupled together around the pipe. Such a pipe cutter includes a tool or cutting device that encircles the pipe and moves toward the pipe in small increments during the cutting process in order to slowly cut into the pipe. Eventually, after many small increments of adjustment toward the pipe, the pipe will be completely cut.

In some cases, one or more of the fixed components utilized to advance the cutting tool toward the pipe may be improperly positioned and lie in a path of a moving component, thereby damaging one or both of the fixed component and the moving component when impact occurs.

Additionally, existing pipe cutting apparatuses may be large in size and have large profiles or thicknesses, thereby limiting the environments in which the pipe cutting apparatuses may be utilized. Moreover, existing pipe cutting apparatuses may not be used in environments having low clearance or small spaces between adjacent pipes.

Furthermore, existing pipe cutting apparatuses include a fixed portion fixed to a pipe and a moveable portion that moves relative to the fixed portion and the pipe. A race is defined in the fixed portion and the moveable portion is adapted to move within the race. Debris often accumulates in the race, thereby inhibiting movement of the moveable portion within the race and negatively impacting operation of the pipe cutting apparatus. Additionally, the race may become dry, thereby creating unwanted friction between the moveable portion and the fixed portion. Such debris and unwanted friction may damage or accelerate wearing/aging of the pipe cutting apparatus.

SUMMARY

The present disclosure is defined by the following claims, and nothing in this section should be taken as a limitation on those claims.

In one aspect, a pipe machining apparatus is provided and includes a frame, a tool carrier coupled to the frame and movable relative to the frame, a tool support coupled to the tool carrier and adapted to support a tool for movement with the tool carrier relative to the frame, the tool support including an advancement member coupled to the tool to advance the tool, and an advancement mechanism coupled to the frame and adapted to rotate relative to the frame between a first position, in which the advancement mechanism is in a travel path of the advancement member and is adapted to be engaged by the advancement member to advance the tool, and a second position, in which the advancement mechanism is positioned out of the travel path of the advancement member and is not adapted to be engaged by the advancement member.

In another aspect, a pipe machining apparatus is provided and includes a frame, a tool carrier coupled to the frame and movable relative to the frame, the tool carrier including a gear rack, a tool support coupled to the tool carrier and adapted to support a tool for movement with the tool carrier relative to the frame, and a drive mechanism including a first motor coupled to the frame, a first pinion gear rotatably coupled to the first motor and engaged with the gear rack, a second motor coupled to the frame, and a second pinion gear rotatably coupled to the second motor and engaged with the gear rack, wherein the first and second motors are adapted to respectively rotate the first and second pinion gears to rotate the tool carrier relative to the frame.

In a further aspect, a pipe machining apparatus is provided and includes a frame defining a race therein, a tool carrier coupled to the frame and movable relative to the frame, a plurality of roller bearings coupled to the tool carrier and positioned within the race, a tool support coupled to the tool carrier and adapted to support a tool for movement with the tool carrier relative to the frame, and a wiper coupled to the tool carrier and moveable within the race relative to the frame, wherein the wiper is adapted to engage the frame within the race.

In yet another aspect, a pipe machining apparatus is provided and includes a frame defining a race therein, a tool carrier coupled to the frame and movable relative to the frame, a plurality of roller bearings coupled to the tool carrier and positioned within the race, a tool support coupled to the tool carrier and adapted to support a tool for movement with the tool carrier relative to the frame, and a lubrication member coupled to the tool carrier and moveable within the race relative to the frame, wherein the lubrication member is adapted to engage the frame within the race.

BRIEF DESCRIPTION OF THE DRAWINGS

The disclosure can be better understood with reference to the following drawings and description. The components in the figures are not necessarily to scale, emphasis instead being placed upon illustrating the principles of the disclosure.

DETAILED DESCRIPTION

Figure 1:
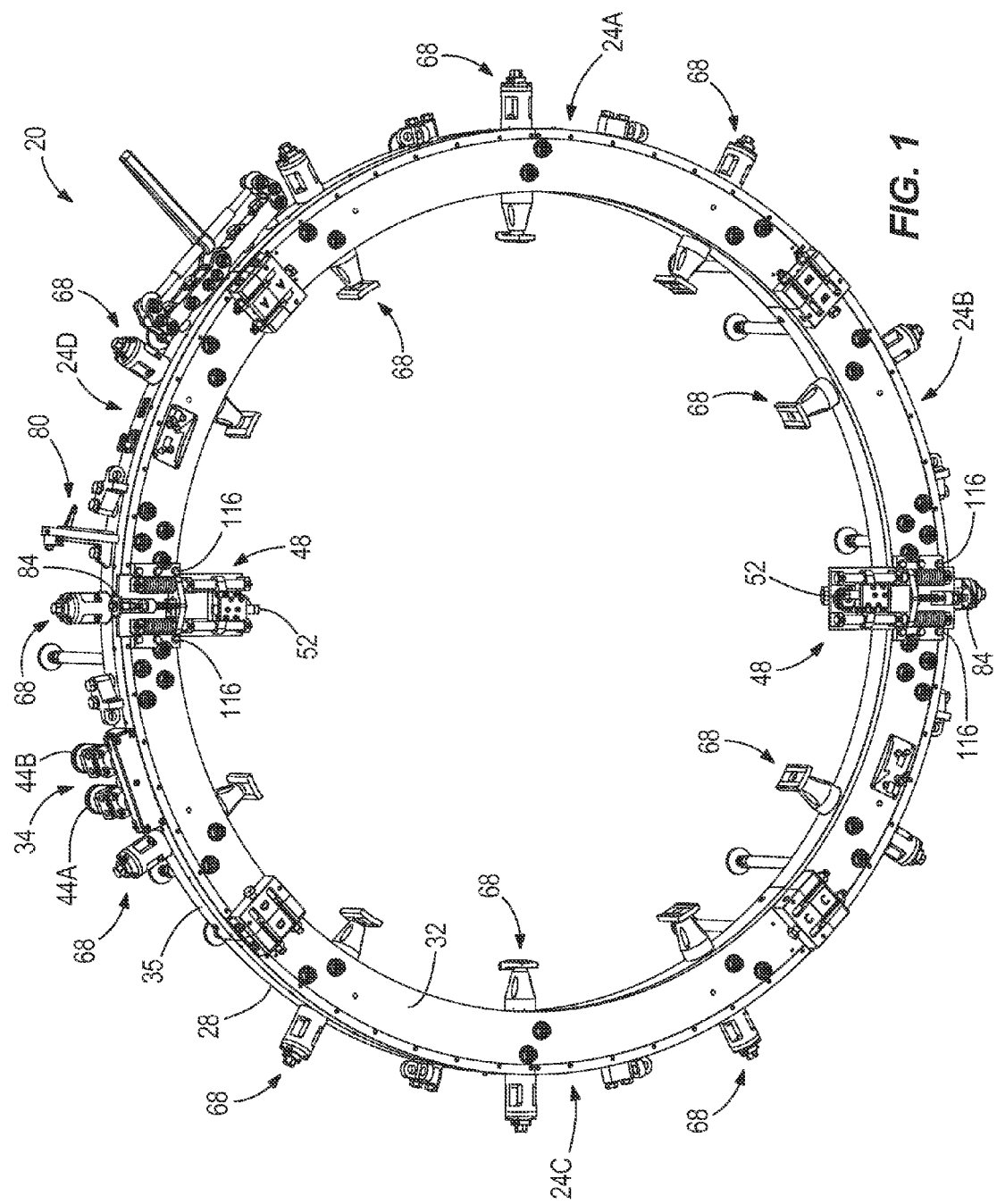
FIG. 1 is a top front perspective view of an exemplary pipe machining apparatus, in accordance with one embodiment.
Figure 2:
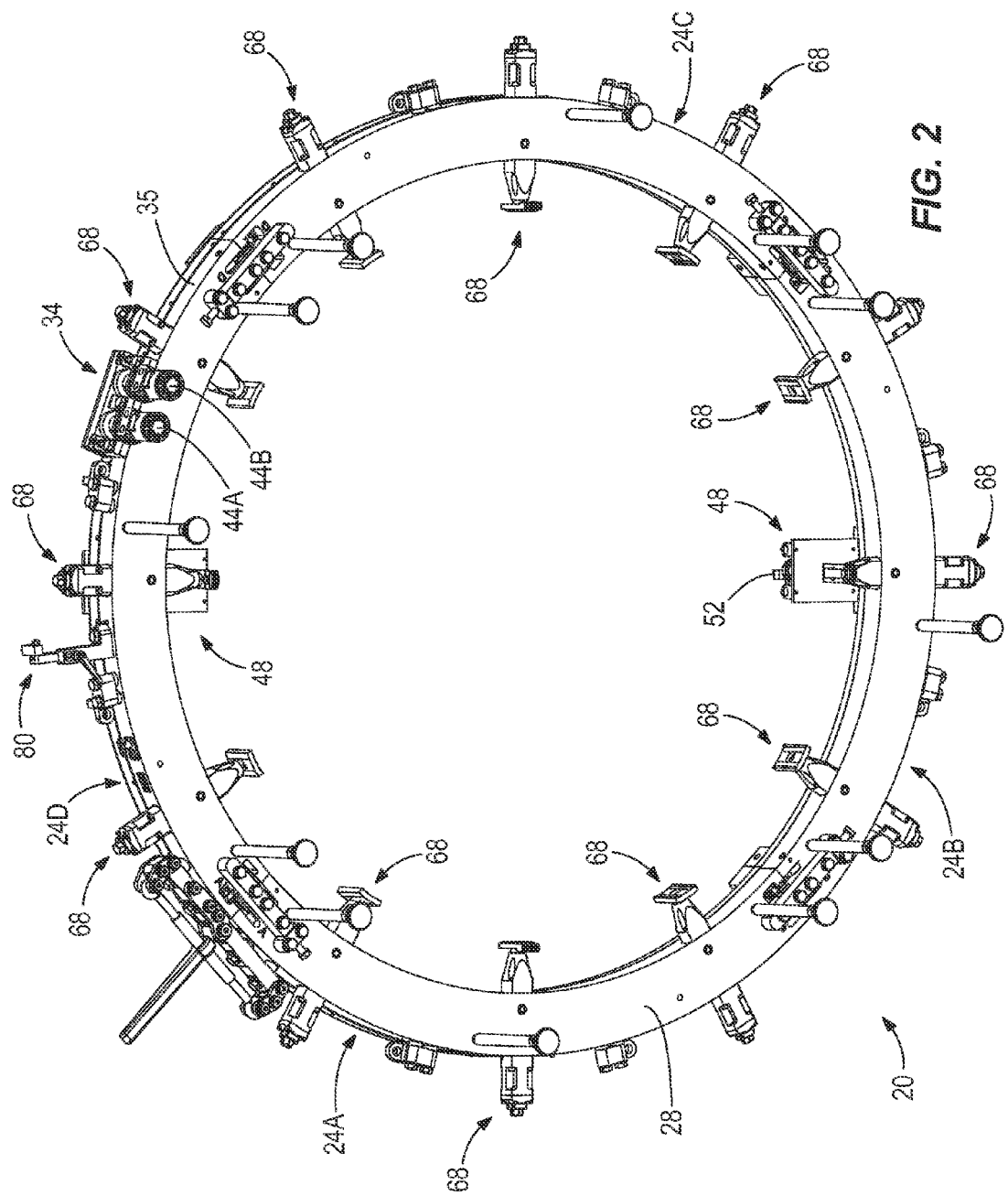
FIG. 2 is a top rear perspective view of the pipe machining apparatus illustrated in FIG. 1, in accordance with one embodiment.
Figure 3:
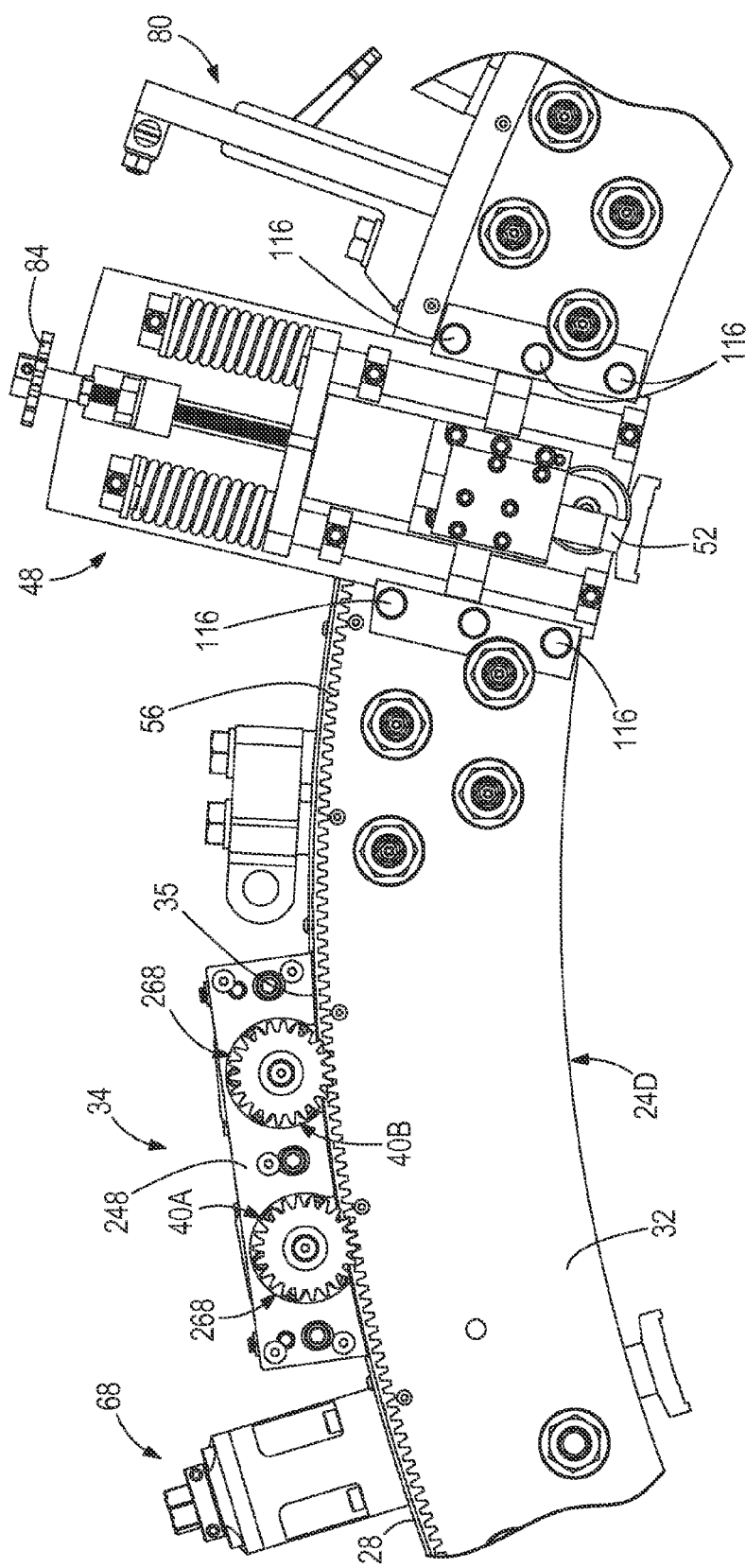
FIG. 3 is a front view of the pipe machining apparatus illustrated in FIG. 1 with a portion thereof broken away to show meshing of pinion gears and a gear rack of the pipe machining apparatus, in accordance with one embodiment.

With reference to FIGS. 1-3, an exemplary embodiment of a pipe machining apparatus 20 adapted to machine pipes of varying diameters is illustrated. In some exemplary embodiments, the apparatus 20 completely cuts through pipes. In other exemplary embodiments, the apparatus 20 prepares an end of a pipe for coupling to another pipe. In still other exemplary embodiments, the apparatus 20 both completely cuts and prepares a pipe for coupling to another pipe. The apparatus 20 is adapted to cut pipes of a variety of different diameters such as, for example, about 60 inches, about 75 inches, about 90 inches, about 105 inches, about 120 inches, less than 60 inches, greater than 120 inches, or any other pipe diameter.

In the illustrated exemplary embodiment, pipe machining apparatus 20 is formed of four joined-together sections 24A, 24B, 24C, 24D and includes a frame 28 and a tool carrier 32. The four joined together sections 24A, 24B, 24C, 24D together comprise the frame 28 and the tool carrier 32. A drive mechanism 34 is coupled to a periphery 35 of the frame 28 and includes a pair of pinion gears 40A, 40B respectively coupled with a pair of suitable drive motors 44A, 44B, such as an air motor with suitable gear reduction means. The frame 28 is adapted to couple and be fixed relative to a pipe, and the tool carrier 32 is rotatable relative to the fixed frame 28 and the pipe. The motors 44A, 44B are adapted to rotate the tool carrier 32 relative to the frame 28 through a gear train.

The rotatable tool carrier 32 includes one or more tool supports 48 (two tool supports 48 shown in the illustrated exemplary embodiment), which support tools 52 for performing a cutting or machining operation on the pipe as the tools 52 rotate circumferentially about the pipe. The tool supports 48 are coupled to the tool carrier 32 by a plurality of fasteners 116. The machining operation performed by the tool(s) 52 may form a straight edge substantially perpendicular to a longitudinal extent of the pipe, a bevel on an end of the pipe that is transverse to and at an angle other than ninety degrees to the longitudinal extent of the pipe, or an edge of a pipe having any angle.

With continued reference to FIGS. 1-3, it can be seen that tool carrier 32 has a circular gear rack 56 for meshing with the pinion gears 40A, 40B coupled to the motors 44A, 44B. Therefore, it can be seen that drive motors 44A, 44B are adapted to rotate tool carrier 32 relative to the frame 28 through a gear train provided by pinion gears 40A, 40B and circular gear rack 56 on the tool carrier 32.

The apparatus 20 further includes a plurality of coupling members 68 engageable with an exterior of the pipe and having suitable adjustability to couple and concentrically or axially locate the apparatus 20 to the exterior of the pipe. The coupling members 68 are also positionable on the apparatus 20 to engage an interior of the pipe and are suitably adjustable to couple and concentrically or axially locate the apparatus 20 to the interior of the pipe.

Tool carrier 32 is rotatably mounted on and supported by frame 28 by a plurality of roller bearings 72. The roller bearings 72 ride in a circular bearing race 76 on the interior of tool carrier 32. A portion of the roller bearings 72 and the race 76 can be seen in FIGS. 9 and 10.

The apparatus 20 also includes an advancement mechanism 80 that is adjustable into and out of a path of an advancement member 84 coupled to each tool support 48 to advance the tool 52 toward the pipe (described in more detail below).

Figure 4:
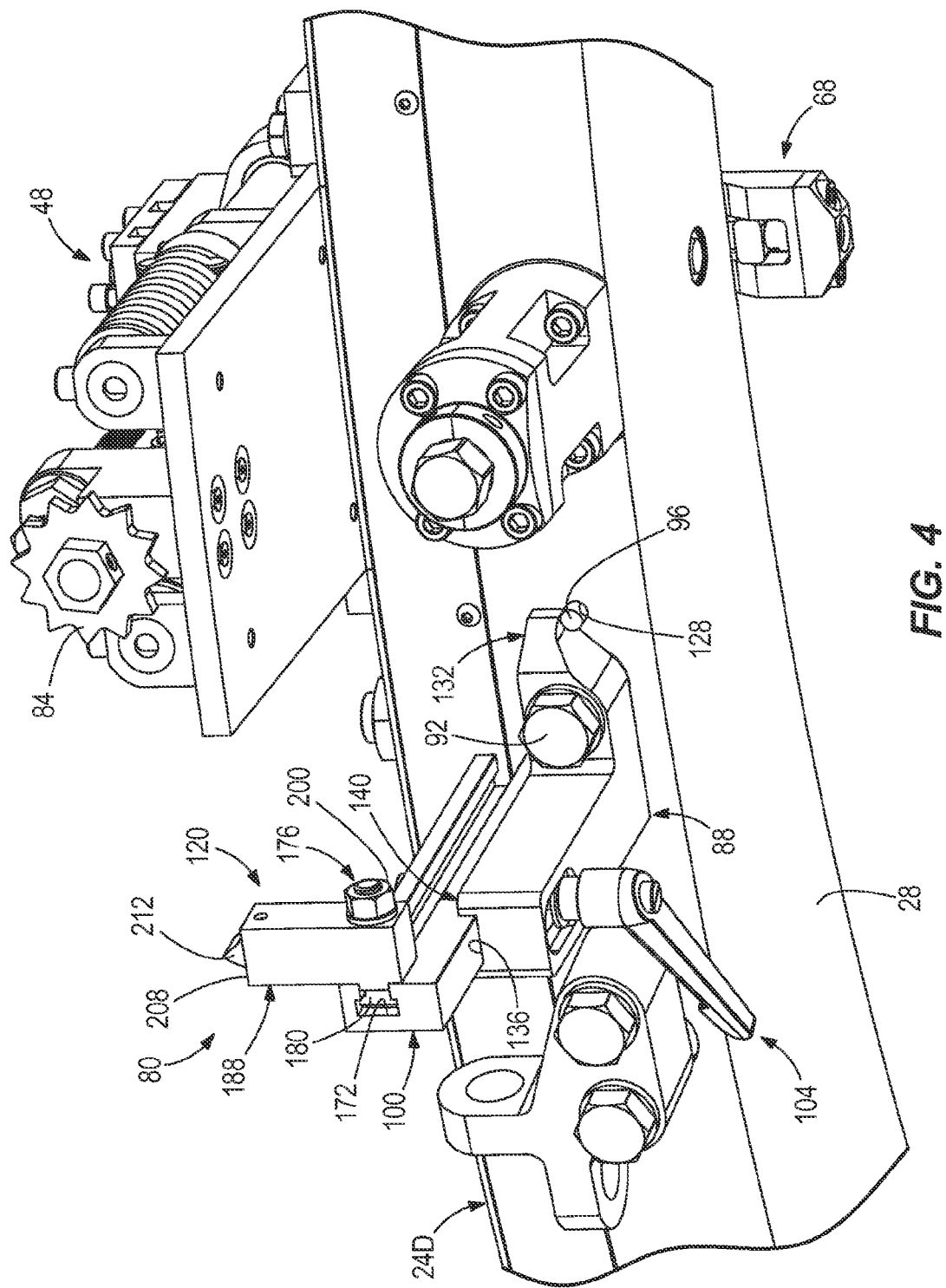
FIG. 4 is a top rear perspective view of an exemplary advancement mechanism and an exemplary tool support of the pipe machining apparatus illustrated in FIG. 1 with the advancement mechanism shown in an operating position, in accordance with one embodiment.
Figure 5:
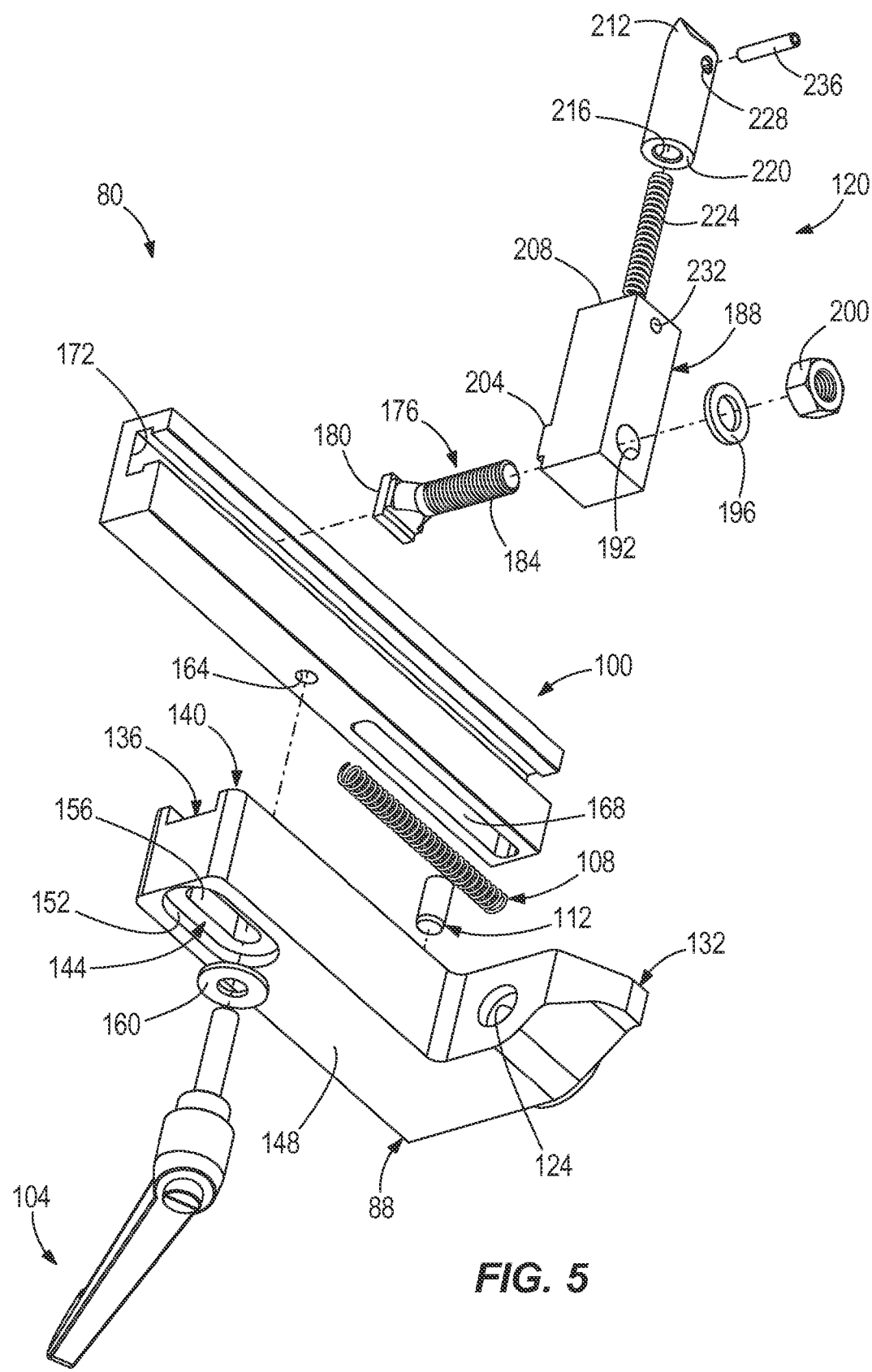
FIG. 5 is an exploded view of the advancement mechanism illustrated in FIG. 4, in accordance with one embodiment.
Figure 6:
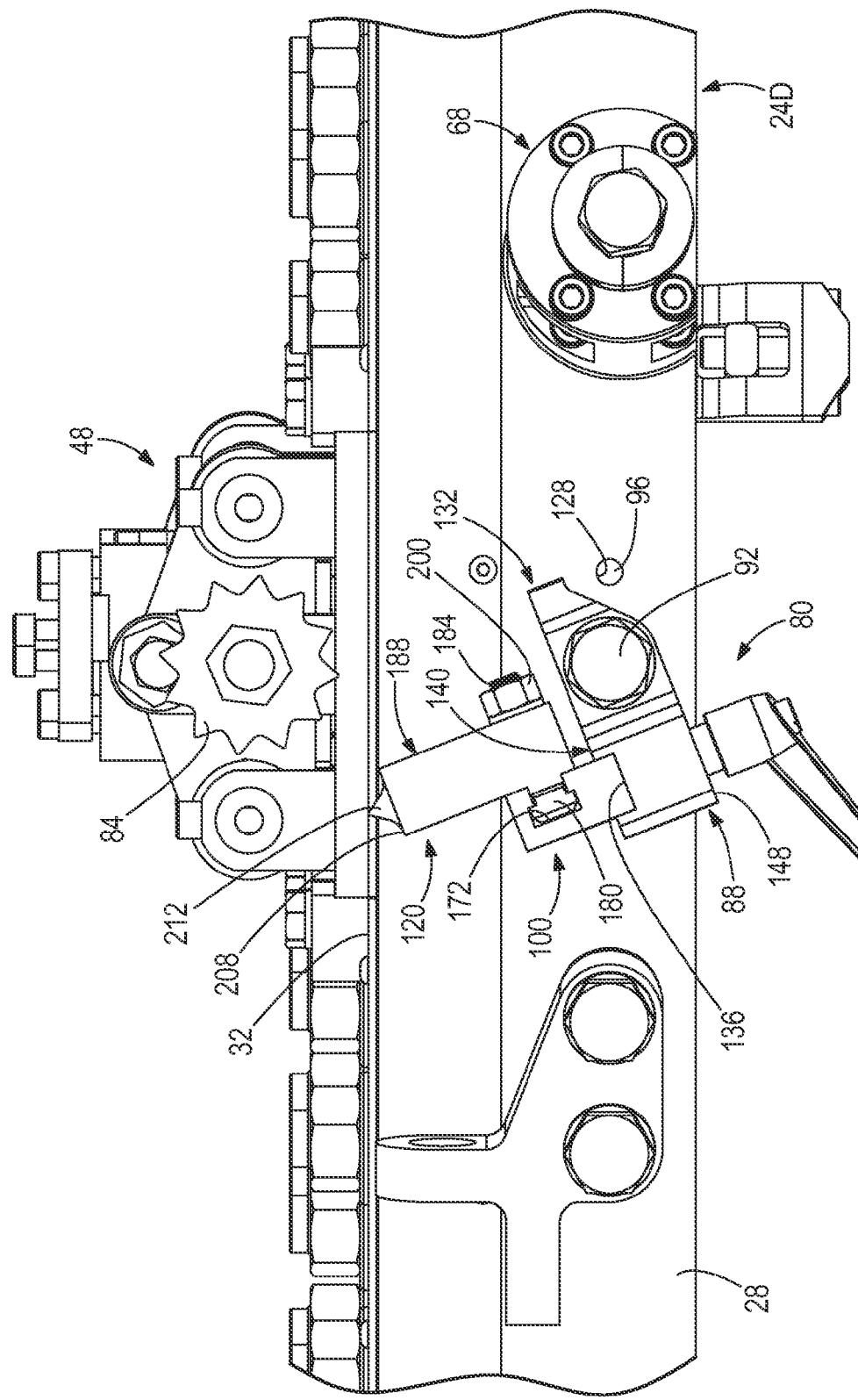
FIG. 6 is an elevational view of the advancement mechanism illustrated in FIG. 4 with the advancement mechanism shown in a breakaway position, in accordance with one embodiment.

With continued reference to FIGS. 1-3 and further reference to FIGS. 4-6, the advancement mechanism 80 is illustrated in more detail. The advancement mechanism 80 includes a base 88, a fastener 92 for coupling the base 88 to the frame 28, a limiting member 96, a guide member 100, a coupling member 104 for securing the guide member 100 to the base 88, a first biasing member 108, a biasing member pin 112, and a finger assembly 120 slidably coupled to the guide member 100.

The advancement mechanism 80 is rotatably coupled to the frame 28 by the fastener 92, which inserts through an aperture 124 defined in the base 88 and threads into the frame 28. The advancement mechanism 80 is rotatable between a first or operating position (see FIG. 4), in which the advancement mechanism 80 is properly positioned in the path of the advancement member 84 to engage the advancement member 84 and advance the tool 52 toward the pipe, and a second or breakaway position (see FIG. 6), in which the advancement mechanism 80 is rotated out of the path of the advancement member 84 and does not engage the advancement member 84. The level of securement of the base 88 to the frame 28 by the fastener 92 is at a sufficient level to maintain the advancement mechanism 80 in the operating position when the advancement member 84 engages the advancement mechanism 80, but allows the advancement mechanism 80 to rotate to the breakaway position if the advancement mechanism 80 is improperly engaged by an undesirable portion of the apparatus 20 such as, for example, the tool support 48. The ability of the advancement mechanism 80 to rotate to the breakaway position inhibits damage to the advancement mechanism 80 and/or to the portion of the apparatus 20 improperly engaging the advancement mechanism 80 when such an engagement occurs.

The limiting member 96 is coupled to the frame 28 by press-fitting, friction-fitting, or other manners of securement in an aperture 128 defined in the frame 28. The limiting member 96 is adapted to be engaged by a projection 132 on the base 88 to limit clockwise rotation (as viewed in the figures) and establish the operating position of the advancement mechanism 80. The base 88 defines a channel 136 and a pin aperture in a top surface 140 thereof. The channel 136 is configured to receive the guide member 100 therein and the pin aperture is adapted to receive the biasing member pin 112 therein. A coupling aperture 144 is also defined through the base 88 which opens to the top surface 140 within the channel 136 and opens to a bottom surface 148 of the base 88. In the bottom surface 148, the coupling aperture 144 includes a larger portion 152 surrounding a smaller portion 156. The coupling aperture 144 is elongated or slotted and the coupling member 104 is adapted to extend through the coupling aperture 144. The larger portion 152 of the coupling aperture 144 is configured to receive a washer 160 therein and the smaller portion 156 of the coupling aperture 144 is configured to receive a threaded portion of the coupling member 104. The threaded portion extends through the coupling aperture 144 and is threadably received in a coupling aperture 164 defined in the guide member 100. The coupling member 104 is adjustable to tightly secure the guide member 100 to the base 88 or the coupling member 104 may be loosened to allow movement of the guide member 100 within the channel 136. The elongated coupling aperture 144 defined in the base 88 limits the extent, in both directions, to which the guide member 100 may move within the channel 136 relative to the base 88. The biasing member 108 is positioned within a slot 168 defined in the guide member 100 and is in a compressed condition between the biasing member pin 112 and an end of the slot 168. The compressed biasing member 108 exerts a force on the guide member 100 in a direction away from the frame 28 to move the guide member 100 away from the frame 28 when the guide member 100 is not sufficiently coupled to the base 88 by coupling member 104.

The guide member 100 also defines a channel 172 therein that is adapted to receive a portion of the finger assembly 120 therein and facilitate movement of the finger assembly 120 relative to the guide member 100 within the channel 172.

The finger assembly 120 includes a channel member 176 including a head 180 positioned within the channel 172 and a threaded portion 184 extending through a housing 188 of the finger assembly 120. The housing 188 defines an aperture 192 there through for receiving the channel member 176. The finger assembly 120 also includes a washer 196 and a nut 200 for threadably engaging the threaded portion 184 of the channel member 176 and coupling the channel member 176 to the housing 188. The housing 188 also includes a projection 204 aligned with the channel member 176 and positioned within the channel 172. The aperture 192 also extends through the projection 204 of the housing 188. The nut 200 can be tightened and loosened to selectively couple and uncouple the finger assembly 120 relative to the guide member 100. When loosened, the finger assembly 120 can be moved along the guide member 100 to a desired positioned. The desired position may be a position aligning the finger assembly 120 (and more particularly the engagement member 212) with the advancement member 84. When positioned in the desired location, the nut 200 can be tightened to rigidly secure or couple the finger assembly 120 relative to the guide member 100.

A cavity is defined in the housing 188 and includes a bottom surface and an open end in a top surface 208 of the housing 188. The cavity is configured to complement the size and shape of an engagement member 212 of the finger assembly 120. In the illustrated exemplary embodiment, both the cavity and the engagement member 212 are substantially cylindrical in shape. The engagement member 212 defines an engagement member cavity 216 therein having an end surface within the engagement member 212 and an open end opening to a bottom surface 220 of the engagement member 212. The engagement member cavity 216 is adapted to receive a biasing member 224 therein. The biasing member 224 is positioned in the engagement member cavity 216 in a compressed condition between the bottom surface of the housing cavity and the end surface of the engagement member cavity 216. The compressed biasing member 224 exerts a force on the engagement member 212 in a direction away from the housing 188 and out of the open end of the cavity defined in the top surface 208 of the housing 188. A hole 228 is defined through the engagement member 212 that is aligned with a hole 232 in the housing 188. An engagement member pin 236 is positioned in aligned holes 228, 232 and limits the extent to which the engagement member 212 may protrude upwardly out of the housing cavity. During operation, the advancement member 84 engages the engagement member 212 and applies a downward force upon the engagement member 212. Such downward force opposes the upward spring force applied to the engagement member 212 by the biasing member 224. When the downward force exceeds the upward force, the engagement member 212 will move downward. When the upward force exceeds the downward force, the engagement member 212 will move upward. This movement by the engagement member 212 provides shock absorbing characteristics to the finger assembly 120.

In some instances, the advancement mechanism 80 may be undesirably positioned in the path of some portion of the apparatus 20 other than the advancement member 84. For example, as illustrated in FIG. 6, the advancement mechanism 80 may be in the path of the tool support 48. In such instances, the finger assembly 120 or some other portion of the advancement mechanism 80 may be undesirably engaged. To inhibit damage to the advancement mechanism 80 and/or other portions of the apparatus 20, the advancement mechanism 80 will rotate counterclockwise (as illustrated) to a breakaway position (see FIG. 6) when contacted by an undesirable portion of the apparatus 20. In the breakaway position, the advancement mechanism 80 is displaced out of the path of the portions of the apparatus 20 moving relative to the advancement mechanism 80. Thus, the advancement mechanism 80 is in a safe position where it can no longer be engaged in a sufficient manner to cause damage to the advancement mechanism 80 and/or other portions of the apparatus 20. A user may rotate the advancement mechanism 80 in a clockwise direction (as illustrated) until the projection 132 engages the limiting member 96, at which point the advancement mechanism 80 is again positioned in the operating position.

Figure 7:
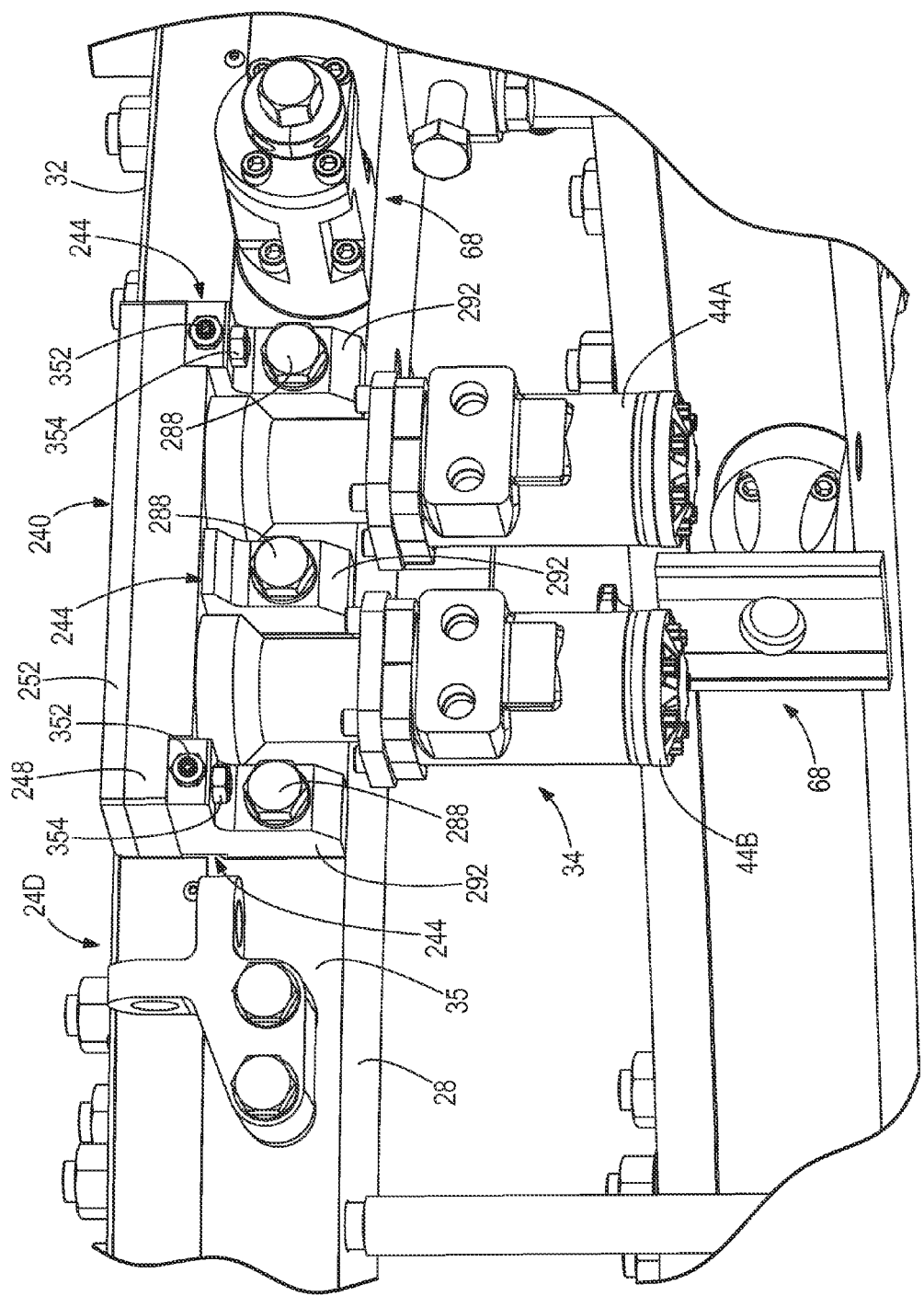
FIG. 7 is an enlarged top rear perspective view of an exemplary drive mechanism of the pipe machining apparatus illustrated in FIG. 1, in accordance with one embodiment.
Figure 8:
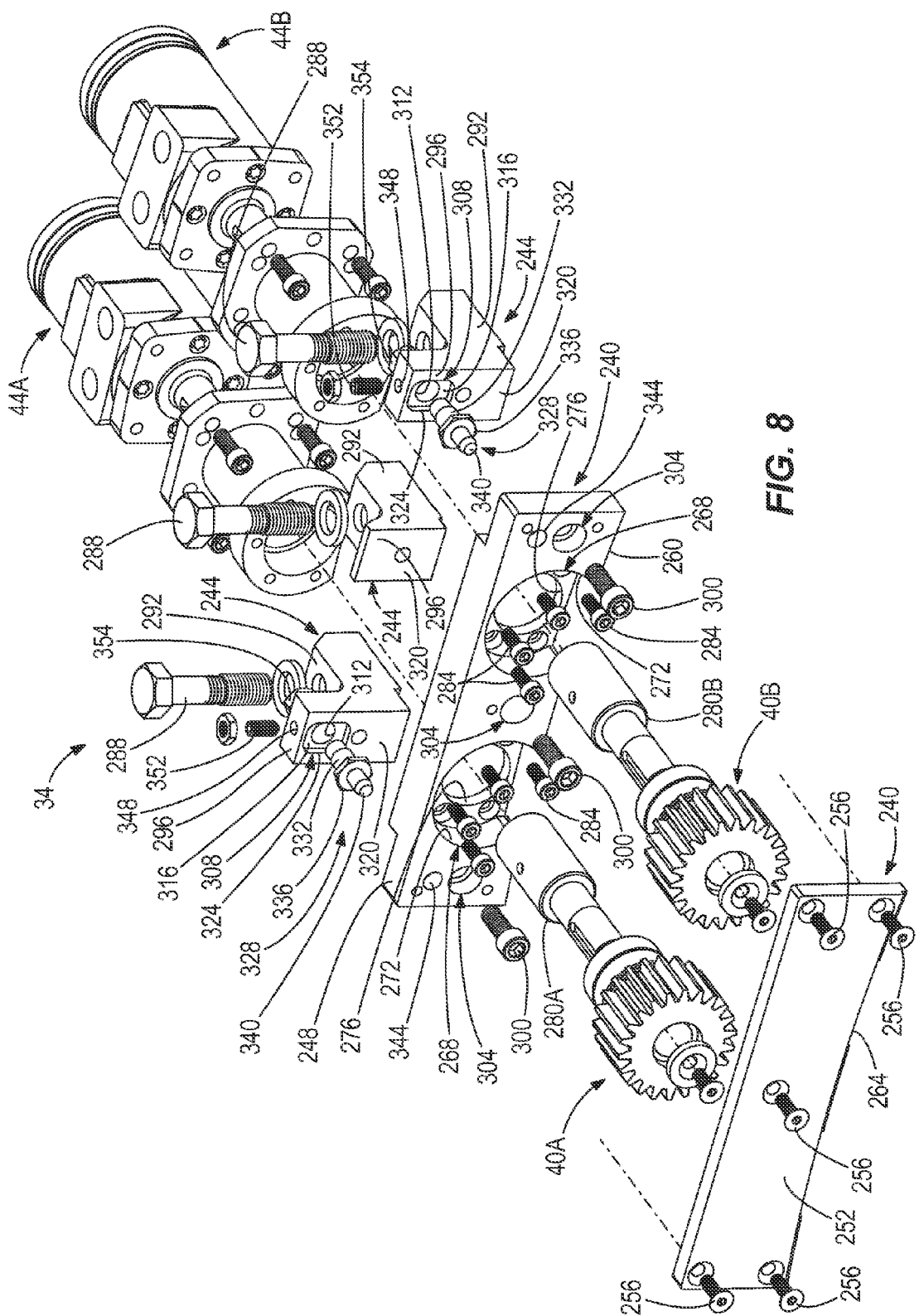
FIG. 8 is an exploded view of the drive mechanism illustrated in FIG. 7, in accordance with one embodiment.

With further reference to FIGS. 1-3 and additional reference to FIGS. 7 and 8, the drive mechanism 34 is illustrated in further detail. Prior pipe machining apparatuses include a drive mechanism comprised of a single motor and the single motor must be sufficiently powerful to perform the necessary rotation of the tool carrier and associated components. Generally speaking, motors increase in size as motors become more powerful. A particular amount of power is required to rotate the tool carrier 32 relative to the frame 28. A single motor with sufficient power to rotate the tool carrier 32 relative to the frame 28 would project a relatively large distance out from the frame 28. In the illustrated exemplary embodiment, the drive mechanism 34 includes two drive motors 44A, 44B, which allows each motor to be about half as powerful as a single motor and still provide sufficient power to perform the necessary rotation of the tool carrier 32 and associated components relative to the frame 28. Since the motors 44A, 44B have lower power, they are smaller than a single motor providing the same amount of power. Thus, the drive mechanism 34 projects less of a distance out from the frame 28 than a conventional drive mechanism comprised of a single motor. In other words, the apparatus 20 has a smaller profile because the drive mechanism 34 does not extend substantially beyond a periphery 35 of the frame 28. This low profile is beneficial because it allows the apparatus 20 to be used in environments having low clearance between adjacent pipes or other compact, tight, or relatively small environments. Additionally, for example, the apparatus 20 may be placed in an interior of a pipe and the drive mechanism 34 must have a low profile so that the coupling members 68 can project beyond the drive mechanism 34 to engage the interior surface of the pipe. If the drive mechanism projected too far outside the outer surface of the frame 28 (such as in the instance of a drive mechanism with a single motor), the coupling members could not reach the interior surface of the pipe or the coupling members would have to extend so far beyond the periphery of the frame 28 that an insecure engagement between the coupling members and the interior surface of the pipe would be provided.

Along with the two pinion gears 40A, 40B and two motors 44A, 44B, the drive mechanism 34 includes a housing 240 and a plurality of coupling members 244 for coupling the drive mechanism 34 to the frame 28. The housing 240 includes a base 248 and a cover 252 coupled to the base 248 with a plurality of fasteners 256. The base 248 and the cover 252 both have an arcuate engagement surface 260, 264 that is complementary in shape to the arcuate periphery 35 of the frame 28, thereby providing contact between the housing 240 and the frame 28 across a substantial length of the housing 240. This contact along a substantial length of the housing 240 provides stability to the drive mechanism 34 when coupled to the frame 28 and inhibits undesirable movement of the drive mechanism 34 relative to the frame 28. The base 248 defines a pair of apertures 268 there through adapted to receive the pinion gears 40A, 40B therein. Each aperture 268 includes a larger portion 272 sized slightly larger than the pinion gears 40A, 40B and a smaller portion 276 adapted to allow a drive shaft 280A, 280B of the motors 44A, 44B to pass through the base 248. The motors 44A, 44B are coupled to the base 248 with a plurality of fasteners 284. The coupling members 244 are coupled to the frame 28 with a plurality of fasteners 288, one fastener 288 for each coupling member 244. The coupling members 244 are generally "L" shaped and include a first portion 292 coupled to the frame 28 and a second portion 296 extending generally perpendicularly from the first portion 292 and coupled to the base 248. A plurality of fasteners 300 are used to couple the base 248 to the coupling members 244 and the base 248 defines a plurality of apertures 304 there through for receiving the fasteners 300. The apertures 304 are slotted or elongated in shape to allow movement of the housing 240, the pinion gears 40A, 40B, and motors 44A, 44B relative to the coupling members 244 (described in more detail below). Each of the two outer coupling members 244 also defines a pin aperture 308 in the second portion 296. Each pin aperture 308 includes a first smaller portion 312 and a second larger portion 316 opening to a surface 320 adjacent the base 248. The transition from the first smaller portion 312 to the second larger portion 316 provides a shoulder 324. The apertures 308 are adapted to receive pins 328 therein and each pin 328 includes a first portion 332 received in the first smaller portion 312 of the corresponding aperture 308, a second portion 336 larger than the first portion 332 and larger than the first smaller portion 312 of the aperture 308, and a third portion 340 that is positioned in an aperture 344 defined in the base 248. The second portion 336 of the pin 328 is positioned in the second larger portion 316 of the aperture 308 in the coupling member 244 and engages the shoulder 324. The second larger portion 316 of the aperture 308 in the coupling member 244 is larger in size than the second portion 336 of the pin 328. The two outer coupling members 244 further define adjustment apertures 348 in second portions 296 of the coupling members 244. The adjustment apertures 348 are generally perpendicular to the pin apertures 308 and the first portion 292 of the coupling member 244, and open into the first smaller portion 312 of the pin apertures 308. Moreover, the adjustment apertures 348 align with the first portion 332 of the pin 328. A threaded fastener 352 is threadably positioned within each of the adjustment apertures 348 and is adapted to thread into the adjustment aperture 348 to engage the first portion 332 of the corresponding pin 328. Engagement between the fasteners 352 and the pins 328 secures the housing 240, the pinion gears 40A, 40B, and the motors 44A, 44B in a rigid manner relative to the coupling members 244 and the frame 28.

The drive mechanism 34 is adapted to allow movement of portions thereof relative to the frame 28 and the gear rack 56. This movement facilitates adjustment of the drive mechanism 34 to properly mesh the pinion gears 40A, 40B with the gear rack 56. Once the pinion gears 40A, 40B are properly meshed with the gear rack 56, the drive mechanism 34 can be rigidly secured to the frame 28.

To facilitate this adjustment, the coupling members 244 are rigidly secured to the frame 28 with fasteners 288, the housing 240 is loosely coupled to the coupling members 244 with fasteners 300, and the pins 328 are positioned in apertures 344 defined in the base 248. Once the pinion gears 40A, 40B are meshed with the gear rack 56, the fasteners 300 may be tightened to secure the housing 240 to the coupling members 244 and the threaded fasteners 352 are threaded into the adjustment apertures 348 and into contact with the first portions 332 of the pins 328 to secure the drive mechanism 34 rigidly to the frame 28. The elongated shape of the apertures 268 and the second larger portion 316 of the apertures 308 allows movement of the housing 240, the pinion gears 40A, 40B, and the motors 44A, 44B relative to the coupling members 244 (and toward the frame 28) when the threaded fasteners 352 push against the first portions 332 of the pins 328, thereby securing the drive mechanism 34 in place. Nuts 354 are tightened to secure pins 328 to coupling members 244. With pins 328 secured to coupling members 244, drive mechanism 24 may be repeatedly removed from and coupled to the frame 28 while maintaining proper meshing of the pinion gears 40A, 40B to the gear rack 56.

Figure 9:
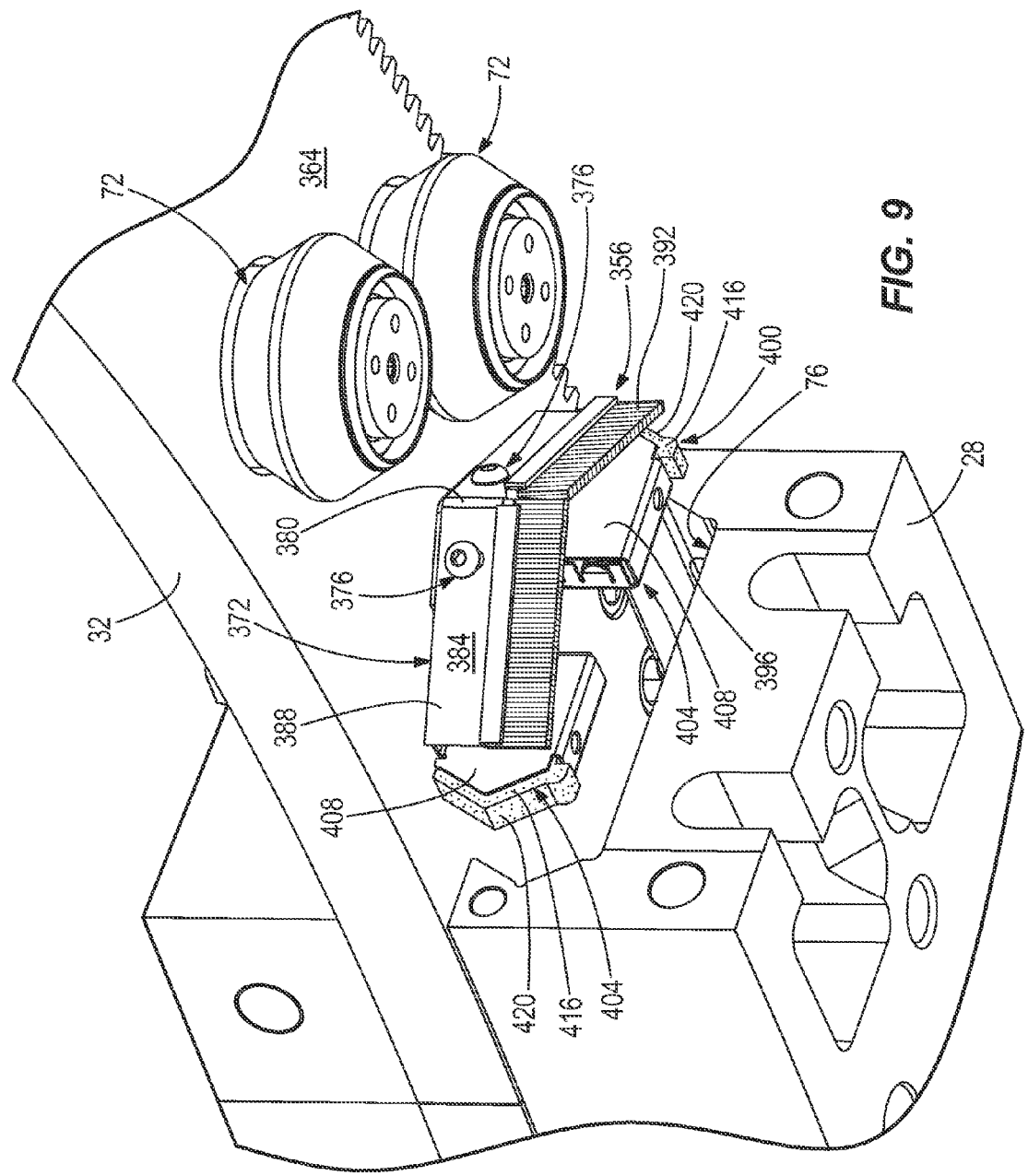
FIG. 9 is a rear perspective view of a race wiper mechanism and a race lubrication assembly of the pipe machining apparatus illustrated in FIG. 1, in accordance with one embodiment.
Figure 10:
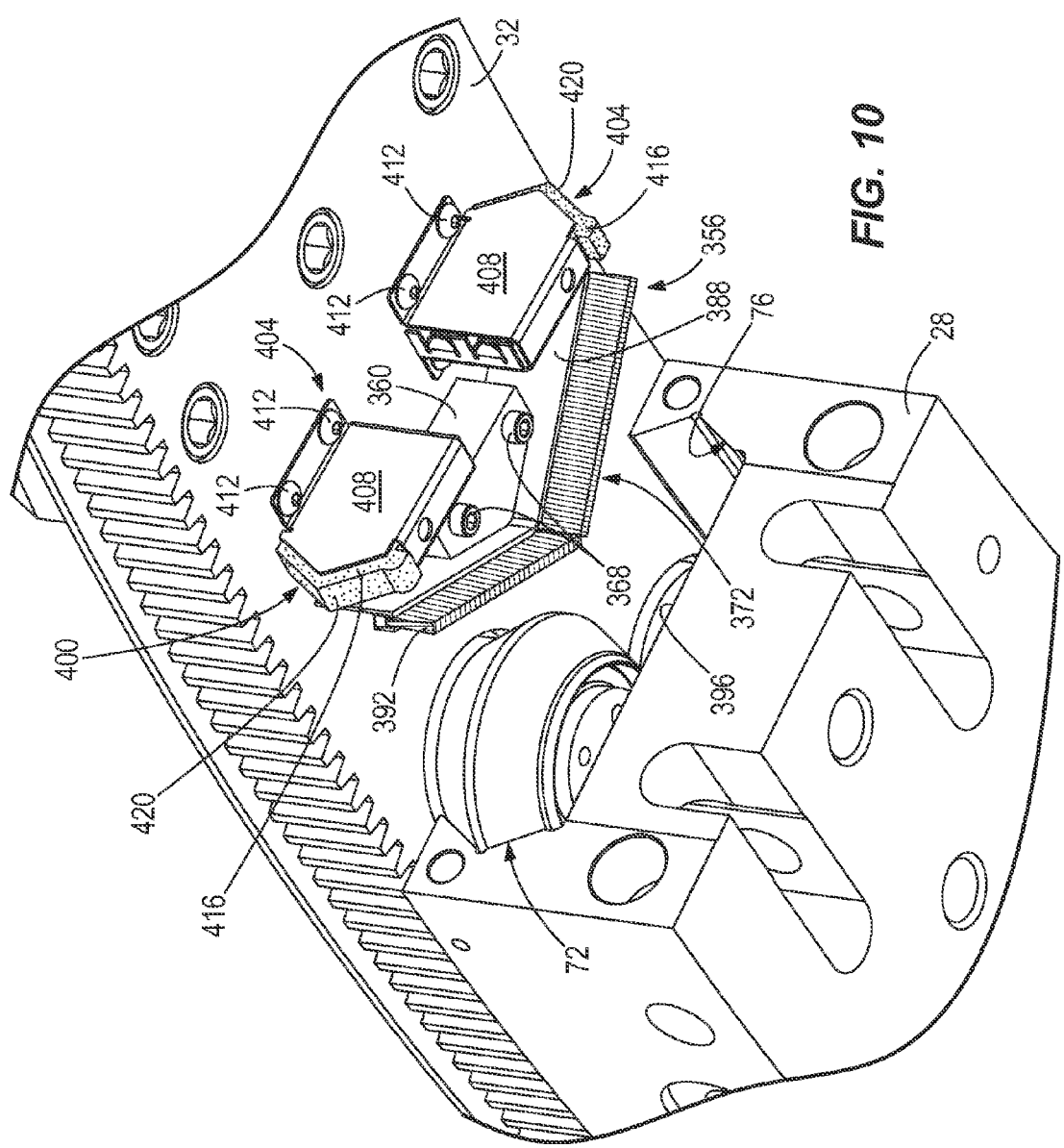
FIG. 10 is another rear perspective view of the race wiper mechanism and the race lubrication assembly illustrated in FIG. 9, in accordance with one embodiment.
Figure 11:
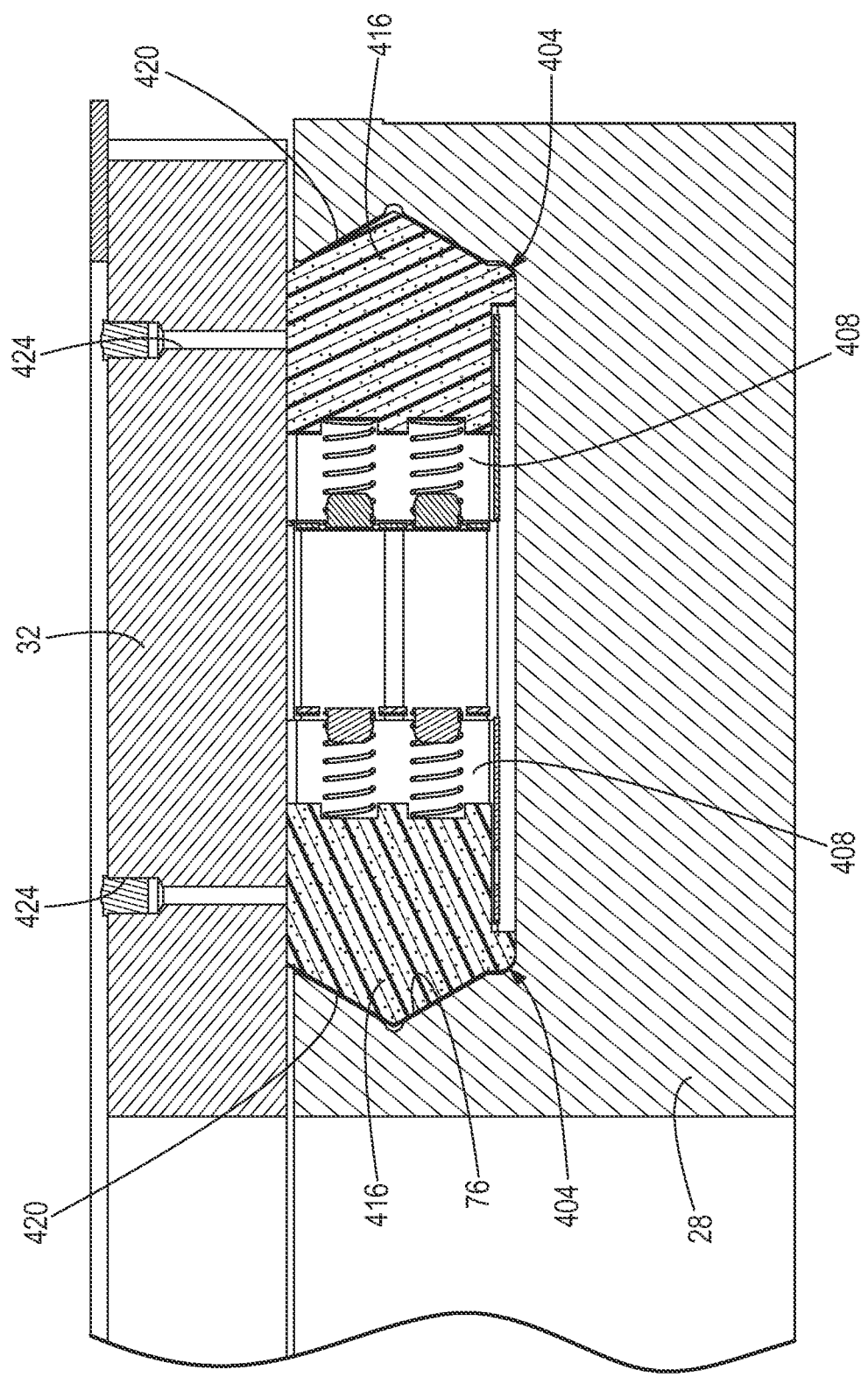
FIG. 11 is a cross-sectional view taken along a reference plane extending through a center of and parallel to a longitudinal extent of the race lubrication assembly shown in FIG. 9, in accordance with one embodiment.

With continued reference to FIGS. 1-3 and additional reference to FIGS. 9-11, the apparatus 20 further includes a plurality of race wiper mechanisms 356 spaced apart along the apparatus 20. Alternatively, the apparatus 20 may include only a single race wiper mechanism 356. During operation of the apparatus 20, debris may accumulate in the race 76 and interfere with operation of the bearings 72. After prolonged exposure of the bearings 72 to debris, operation of the bearings 72 may be negatively impacted and the bearings 72 may be damaged or even fail. Thus, the race wiper mechanisms 356 are adapted to remove debris from the path of the bearings 72 within the race 76.

The race wiper mechanisms 356 are disposed at various locations around the apparatus 20 and all the race wiper mechanisms 356 are substantially identical. Thus, for simplicity, only a single race wiper mechanism 356 is illustrated and described herein. The race wiper mechanism 356 includes a base 360 coupled to an interior surface 364 of the tool carrier 32 via a pair of fasteners 368 and a wiper 372 coupled to the base 360 with a pair of fasteners 376. In the illustrated exemplary embodiment, the base 360 and the wiper 372 are configured to provide a leading edge 380 or arrow shape on a leading surface 384 of the wiper 372 with the leading surface 384 extending behind the leading edge 380. The wiper 372 includes a rigid portion 388 coupled to the base 360 and a resilient portion 392 extending from the rigid portion 388. The resilient portion 392 may be a wide variety of materials and have a wide variety of configurations. In the illustrated exemplary embodiment, the resilient portion 392 is comprised of bristles made of nylon. Alternatively, the resilient portion 392 may be comprised of other materials such as, for example, rubber, plastic, horse hair, or any polymer or composite, etc., and have other configurations such as, for example, a solid unitary blade, etc. The race wiper mechanism 356 is coupled to the tool carrier 32 such that the leading edge 380 of the wiper mechanism 356 leads the way through the race 76 as the tool carrier 32 rotates. In this manner, the wiper 372 engages and moves the debris toward the edges of the race 76. Additionally, the resilient bristles 392 brush against an interior surface 396 of the race 76 to dislodge any debris in the race 76. The wiper 372 extends across a substantial portion of the race 76 to engage debris substantially anywhere within the race 76.

With further reference to FIGS. 1-3 and additional reference to FIGS. 9-11, the apparatus 20 further includes a plurality of race lubrication assemblies 400 spaced apart along the apparatus 20. During operation of the apparatus 20, bearings 72 move within the race 76 and forces are realized between the race 76 and the bearings 72. Thus, it is desirable to maintain a desired amount of lubrication within the race 76. The race lubrication assemblies 400 can provide the desired level of race lubrication.

The race lubrication assemblies 400 are disposed at various locations around the apparatus 20 and all the race lubrication assemblies 400 are substantially identical. Thus, for simplicity, only a single race lubrication assembly 400 is illustrated and described herein. The race lubrication assembly 400 includes two substantially identical race lubrication mechanisms 404, one on each of opposing sides of the race 76 and generally oriented as mirror images of each other about a center of the race 76. Thus, for simplicity, the structure of only one of the race lubrication mechanisms 404 will be described. The race lubrication mechanism 404 includes a housing 408 coupled to the interior surface 364 of the tool carrier 32 by a plurality of fasteners 412 and an absorbent member 416 supported by and partially positioned within the housing 408. The absorbent member 416 projects out of the housing 408 and has an outer edge 420 that is shaped substantially complementary to the corresponding side of the race 76 such that the absorbent member 416 can apply lubricant to the side of the race 76. The housing 408 is sized slightly larger than the absorbent member 416, thereby allowing for lateral movement of the absorbent member 416 relative to the housing 408 in order to accommodate forces applied to the outer edge 420 of the absorbent member 416 during operation of the apparatus 20. The absorbent member may be made of a variety of different materials such as, for example, felt, any composite material, any wicking material, etc. Each race lubrication mechanism 404 may include a biasing member engaging a respective inner edge of the absorbent member 416 to bias the outer edge 420 of the absorbent member 416 outward into engagement and against a respective surface of the race 76.

Each race lubrication assembly 400 also includes a pair of lubrication apertures 424 defined through the tool carrier 32 with one of the lubrication apertures 424 aligned with each absorbent member 416. Lubrication can be injected into the lubrication apertures 424 and absorbed into the absorbent members 416. The absorbent members 416 then apply the lubrication to the sides of the race 76. A cap, cover or seal may be selectively positionable in an open end of the apertures 424 to seal or otherwise inhibit lubrication from escaping the apertures 424 from the open end.

The components and associated functionalities of the pipe machining apparatus included herein are adapted to be included in any size pipe machining apparatus to machine any size pipe and operate in the same manner, thereby providing a modularity capability to the present disclosure. That is, for example, whether the pipe machining apparatus is adapted to cut pipes of 60 inches or 120 inches, the advancement mechanism, the drive mechanism, the race wiper mechanisms, the race lubrication assemblies, etc., are all adapted to be included in any possible size pipe machining apparatus and operate in the same manner.

It should be understood that the use of any orientation or directional terms herein such as, for example, "top", "bottom", "front", "rear", "back", "left", "right", "side", etc., is not intended to imply only a single orientation of the item with which it is associated or to limit the present disclosure in any manner. The use of such orientation or directional terms is intended to assist with the understanding of principles disclosed herein and to correspond to the exemplary orientation illustrated in the drawings. For example, the pipe machining apparatus may be utilized in any orientation and use of such terms is intended to correspond to the exemplary orientation of the pipe machining apparatus illustrated in the drawings. The use of these terms in association with the pipe machining apparatus is not intended to limit the pipe machining apparatus to a single orientation or to limit the pipe machining apparatus in any manner.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

While various embodiments of the disclosure have been described, it will be apparent to those of ordinary skill in the art that other embodiments and implementations are possible within the scope of the disclosure. Accordingly, the disclosure is not to be restricted except in light of the attached claims and their equivalents.

The invention claimed is:
1. A pipe machining apparatus comprising:
a frame;
a tool carrier coupled to the frame and movable relative to the frame, the tool carrier including a gear rack;
a tool support coupled to the tool carrier and adapted to support a tool for movement with the tool carrier relative to the frame; and
a drive mechanism including
a first motor coupled to the frame and including a first drive shaft, wherein the first motor is adapted to rotate the first drive shaft, a first pinion gear engaged with and rotatable with the first drive shaft, wherein the first pinion gear is adapted to engage the gear rack, a second motor coupled to the frame and including a second drive shaft, wherein the second motor is adapted to rotate the second drive shaft, and a second pinion gear engaged with and rotatable with the second drive shaft, wherein the second pinion gear is adapted to engage with the gear rack;

wherein the first and second motors are adapted to respectively rotate the first and second pinion gears to rotate the tool carrier relative to the frame;

wherein the drive mechanism further includes a housing including an arcuate surface engageable with a peripheral surface of the frame.

2. The pipe machining apparatus of claim 1, wherein the drive mechanism further includes a housing to which the first motor and the second motor are adapted to couple, and a plurality of coupling members coupled to the housing and the frame;

wherein the housing is moveable relative to the coupling members.

3. The pipe machining apparatus of claim 2, wherein the drive mechanism further includes a plurality of pins engageable with the housing with one pin coupled to each of the coupling members, and a plurality of fasteners with one fastener moveably coupled to each of the coupling members and engageable with one of the plurality of pins.

4. The pipe machining apparatus of claim 3, wherein the housing, the first motor, and the second motor are moveable relative to the plurality of coupling members and the frame when the plurality of fasteners are in a first condition, and wherein the housing, the first motor, and the second motor are fixed relative to the coupling members and the frame when the plurality of fasteners are in a second condition.

5. A pipe machining apparatus comprising:

a frame;

a tool carrier coupled to the frame and movable relative to the frame, the tool carrier including a gear rack;

a tool support coupled to the tool carrier and adapted to support a tool for movement with the tool carrier relative to the frame; and a drive mechanism including a first motor coupled to the frame, a first pinion gear rotatably coupled to the first motor and adapted to engage the gear rack, a second motor coupled to the frame, and a second pinion gear rotatably coupled to the second motor and adapted to engage with the gear rack;

wherein the first and second motors are adapted to respectively rotate the first and second pinion gears to rotate the tool carrier relative to the frame;

wherein the drive mechanism further includes a housing to which the first motor and the second motor are adapted to couple, and a plurality of coupling members coupled to the housing and the frame; wherein the housing is moveable relative to the coupling members;

wherein the drive mechanism further includes a plurality of pins engageable with the housing with one pin coupled to each of the coupling members, and a plurality of fasteners with one fastener moveably coupled to each of the coupling members and engageable with one of the plurality of pins.

6. The pipe machining apparatus of claim 5, wherein the housing, the first motor, and the second motor are moveable relative to the plurality of coupling members and the frame when the plurality of fasteners are in a first condition, and wherein the housing, the first motor, and the second motor are fixed relative to the coupling members and the frame when the plurality of fasteners are in a second condition.

7. A pipe machining apparatus comprising:

a frame;

a tool carrier coupled to the frame and movable relative to the frame, the tool carrier including a gear rack;

a tool support coupled to the tool carrier and adapted to support a tool for movement with the tool carrier relative to the frame; and a drive mechanism including a first motor coupled to the frame, a first pinion gear rotatably coupled to the first motor and adapted to engage the gear rack, a second motor coupled to the frame, and a second pinion gear rotatably coupled to the second motor and adapted to engage with the gear rack, wherein the first pinion gear and the second pinion gear are moveable toward and away from the gear rack;

wherein the first and second motors are adapted to respectively rotate the first and second pinion gears to rotate the tool carrier relative to the frame with the first and second pinion gears engaged with the gear rack;

wherein the drive mechanism further includes a housing to which the first motor and the second motor are adapted to couple, wherein the housing is adapted to move with the first and second pinion gears relative to the gear rack;

wherein the drive mechanism further includes a plurality of coupling members coupled to the housing and the frame, wherein the housing, the first pinion gear and the second pinion gear are moveable relative to the coupling members; and wherein the drive mechanism further includes a plurality of pins engageable with the housing with one pin coupled to each of the coupling members, and a plurality of fasteners with one fastener moveably coupled to each of the coupling members and engageable with one of the plurality of pins.

8. The pipe machining apparatus of claim 7, wherein the housing, the first pinion gear, and the second pinion gear are moveable relative to the plurality of coupling members and the frame when the plurality of fasteners are in a first condition, and wherein the housing, the first pinion gear, and the second pinion gear are fixed relative to the coupling members and the frame when the plurality of fasteners are in a second condition.

* * * * *